United States Patent
Yoneyama

(10) Patent No.: US 6,579,198 B2
(45) Date of Patent: Jun. 17, 2003

(54) TENNIS RACKET WITH SHAFT HAVING LIGHT WEIGHT METAL PIECE

(75) Inventor: Minoru Yoneyama, Niigata-ken (JP)

(73) Assignee: Yonex Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/214,774

(22) Filed: Aug. 9, 2002

(65) Prior Publication Data

US 2003/0054908 A1 Mar. 20, 2003

(30) Foreign Application Priority Data

Nov. 14, 2001 (JP) ........................................ 2001-348654

(51) Int. Cl.⁷ ................................................ A63B 49/02
(52) U.S. Cl. ........................ 473/544; 473/537; 473/546; 473/521
(58) Field of Search ................................. 573/544, 535, 573/536, 524, 537, 545, 546, 521, 523

(56) References Cited

U.S. PATENT DOCUMENTS 5,423,533 A * 6/1995 Hsu ............................ 473/524
6,293,878 B1 * 9/2001 Iwatsubo et al. ............ 473/521

FOREIGN PATENT DOCUMENTS

JP       3085261        7/2000

* cited by examiner

*Primary Examiner*—Raleigh W. Chiu
(74) *Attorney, Agent, or Firm*—Wenderoth, Lind & Ponack, L.L.P.

(57) ABSTRACT

A tennis racket comprises a frame; a shaft connected to the frame at one end thereof; a grip into which the shaft is inserted at the other end thereof; and a pair of lightweight metal pieces attached to the shaft. The frame and the shaft are formed from fiber-reinforced synthetic resin, the pair of lightweight metal pieces has a U-shaped section and extends from inside the grip at a connecting portion with the shaft and along both sides of the shaft.

13 Claims, 1 Drawing Sheet

TENNIS RACKET WITH SHAFT HAVING LIGHT WEIGHT METAL PIECE

BACKGROUND OF THE INVENTION

The present application claims priority upon Japanese Patent Application No. 2001-348654 filed on Nov. 14, 2001, which is herein incorporated by reference.

1. Field of the Invention

The present invention relates to a tennis racket in which a frame and a shaft are formed from fiber-reinforced synthetic resin (FRP), and the shaft is inserted into a grip for connection thereto.

2. Description of the Related Art

In FRP-made tennis rackets, a shaft and a grip of the racket are integrally formed as a hollow body. Such FRP-made tennis rackets are widely adopted as rackets provided with lightweightness, flexibility and a desired strength. However, tennis rackets need to have a weight of more than a certain extent in order to obtain a desired stroke speed. Thus, lightweightness is not the only requirement for a tennis racket. Further, when flexibility is increased, not only does stroke control become difficult, but also, the damping ratio of vibration after stroking will be decreased. Thus, rigidity to some extent is necessary. On the other hand, if rigidity is increased, the shock transmissibility to the grip will be increased, and thus, problems such as tennis elbows will arise. Therefore, rackets with a good balance of flexibility and rigidity are desired.

Tennis rackets made from FRP only are superior in lightweightness and flexibility, but lack rigidity. Thus, various attempts have been made to pursue the optimal balance of flexibility and rigidity by attaching metal members/components onto a tennis racket.

One example of such an attempt is disclosed in Japanese Patent No. 3 085 261. Here, a structure is proposed in which a metal component is attached to surround a portion of the FRP-made shaft or the FRP-made frame.

Such a metal component can partially increase the rigidity of the shaft or the frame. However, it is not possible to substantially decrease the vibration transmitted to the grip, and attachment of the metal component to certain locations of a tennis racket resulted in significant increase in vibration.

SUMMARY OF THE INVENTION

The present invention has been contrived in view of the above-mentioned problems, and an objective of the present invention is to provide an FRP-made tennis racket improved in both shock transmissibility to the grip and in vibration-damping ratio by ensuring flexibility while increasing rigidity of the shaft.

In order to achieve the above-mentioned objective and other objectives, one aspect of the present invention provides a tennis racket comprising: a frame; a shaft connected to the frame at one end thereof; a grip into which the shaft is inserted at the other end thereof; and a pair of lightweight metal pieces attached to the shaft. Here, the frame and the shaft is formed from fiber-reinforced synthetic resin, and the pair of lightweight metal pieces has a U-shaped section and extends from inside the grip at a connecting portion with the shaft and along both sides of the shaft.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF PREFERRED EMBODIMENTS

A preferred embodiment of the present invention will be explained below with reference to the accompanying drawings.

Figure 1:
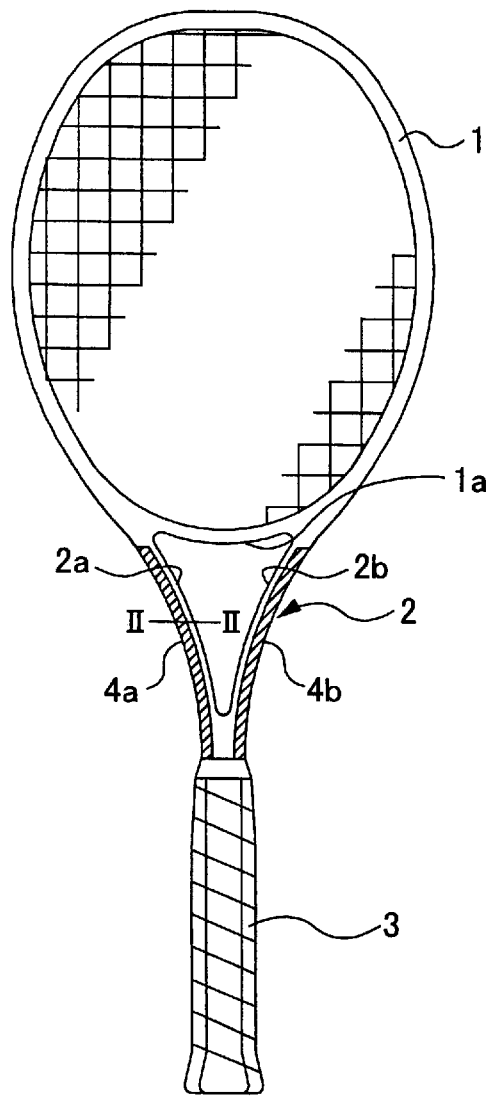
FIG. 1 is a plan view illustrating a tennis racket according to a preferred embodiment of the present invention.
Figure 2:
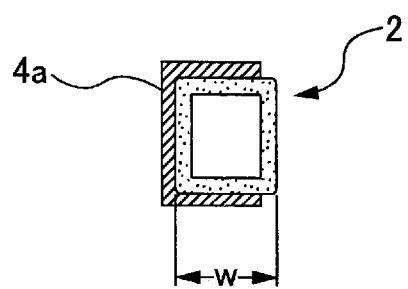
FIG. 2. is a sectional view taken along line II—II in FIG. 1.

FIG. 1 shows a tennis racket according to one embodiment of the present invention. A frame 1 and a shaft 2 are made from FRP and integrally formed in a hollow tube structure. The tip of the shaft 2 is inserted into a grip 3 and is attached to the grip 3 in this state. The shaft 2 is bifurcated at a location with a slight distance from the front end of the grip 3 to form bifurcated shaft portions 2a, 2b. The bifurcated shaft portions 2a, 2b integrate with the frame 1 at their front ends, and define an inverse-triangular space with the arc-shaped lower end 1a of the frame 1.

To the outer side of each of the bifurcated shaft portions 2a, 2b, aluminum strips 4a, 4b having a U-shaped section are integrally fixed, with an adhesive, in a manner so as to cover the outer surface of the bifurcated shaft portions 2a, 2b. The lower ends of each of the aluminum strips 4a, 4b extend into the grip 3 while covering the side surfaces of the shaft 2. Through such a structure, the lower ends of each of the aluminum strips 4a, 4b are firmly sandwiched between the shaft 2 and the grip 3.

The respective front and back surfaces of the aluminum strips 4a, 4b with the U-shaped section do not have to cover the whole width (W) of the respective front and back surfaces of the bifurcated shaft portions 2a, 2b, but only need to cover at least a portion, preferably half or more, of the whole width. Further, in the illustrated example, the aluminum strips 4a, 4b are provided along the whole length of from the inside of the grip 3 to the shaft 2 along the length (longitudinal) direction of the racket. However, for example, the aluminum strips 4a, 4b may be provided to extend beyond half the length of the shaft 2. The length of the aluminum strips 4a, 4b is determined in relation to the flexibility of the FRP-made shaft, and its length may be extended in case a high shaft rigidity is desired.

Further, the thickness of the aluminum strips 4a, 4b with the U-shaped section can be appropriately selected within a range of 0.3 mm–1.5 mm in relation to the necessary shaft rigidity. If the thickness is below this range, a desired rigidity cannot be obtained, whereas if the thickness exceeds this range, increase in weight becomes too large.

Furthermore, the aluminum strips 4a, 4b can be attached to the shaft 2 by integrally burying the aluminum strips 4a, 4b into the FRP material through insert molding so that the surface of the aluminum strips 4a, 4b are coplanar with the surface of the shaft 2, or, by integrally bonding the aluminum strips 4a, 4b to the shaft 2 after molding thereof. In the latter case, it is preferable to use an elastic adhesive containing elastomer resin, such as "SUPER X" (trademark) from CEMEDINE Co., Ltd., as the adhesive.

The shock transmissibility to the grip and the vibration-damping ratio was measured as below using the following types of tennis rackets: a tennis racket A according to an embodiment of the present invention in which aluminum strips 4a, 4b having a U-shaped section are attached to the shaft 2 as shown in the embodiment of FIG. 1; a tennis racket B, as a comparison example, which differs from the above-mentioned embodiment only in an aspect in that, instead of the aluminum strips 4a, 4b, flat aluminum plates, having the same thickness as the aluminum strips 4a, 4b, are attached respectively to the front and back surfaces of the shaft alike the above-mentioned embodiment; and a tennis racket C which differs from the above-mentioned embodiment only in an aspect in that no aluminum strips are attached. Upon measurement, the grip end of the tennis racket, having been strung with a string, is hung with a cord from a tip end of an arm, the tip end being a free end (i.e., in a free end—free end connecting manner), and this state is maintained. An acceleration pickup is attached to the front surface of the grip at a portion 25 mm from the grip end. The shock and vibration transmitted to the acceleration pickup on the grip, upon exertion of a shock having a certain intensity to the string surface of the frame using an impulse hammer, was measured. The shock transmissibility is shown as an index which takes the shock occurring at the grip of tennis racket C as 100. Measurement for the vibration-damping ratio was conducted 0.1 seconds after shock exertion. The results are shown in Table 1.

TABLE 1

|  | RACKET A | RACKET B | RACKET C |
|---|---|---|---|
| SHOCK TRANSMISSIBILITY | 73 | 80 | 100 |
| VIBRATION-DAMPING RATIO (%) | 92 | 83 | 83 |

From the results shown above, it can be appreciated that in the case of racket B attached with the aluminum plates, although the shock transmissibility decreases in comparison to a typical racket C, the vibration-damping ratio is the same. On the contrary, as with racket A according to the present invention, both the shock transmissibility and the vibration-damping ratio are significantly improved in comparison to racket C.

It is to be noted that, although an aluminum strip with U-shaped section was attached to the shaft 2 in the above-mentioned embodiment of the present invention, it is possible to use pure metal or an alloy having a specific gravity of 7.6 g/cm$^3$ or less, such as titanium or magnesium, as lightweight metal other than aluminum.

As explained above, in a tennis racket according to the present invention, a pair of lightweight metal pieces with a U-shaped section are attached so as to extend from inside a grip at a connecting portion with a shaft and along both sides of the shaft. Accordingly, the lightweight metal pieces can increase the rigidity of the shaft while greatly damping the shock transmitted to the grip since the metal pieces have a U-shaped section and the opened side will flexibly expand to allow deflection of the shaft.

Further, since the lightweight metal pieces with a U-shaped section are attached to the shaft which corresponds to the antinode of the second mode of vibration that occurs on the racket after stroking, and since the ends of the lightweight metal pieces are connected to the grip inside of the grip, rigidity is increased and residual vibration is forcedly restrained. Therefore, it is possible to greatly damp the vibration transmitted to the grip.

As explained above, in one aspect of the present invention, there may be provided a tennis racket comprising: a frame; a shaft connected to the frame at one end thereof; a grip into which the shaft is inserted at the other end thereof; and a pair of lightweight metal pieces attached to the shaft, wherein the frame and the shaft is formed from fiber-reinforced synthetic resin, and the pair of lightweight metal pieces has a U-shaped section and extends from inside the grip at a connecting portion with the shaft and along both sides of the shaft.

According to such a structure, it is possible to provide, for example, an FRP-made tennis racket improved in both shock transmissibility to the grip and in vibration-damping ratio by ensuring flexibility while increasing rigidity of the shaft.

As explained above, the shaft may be bifurcated from the grip towards the frame, and the pair of lightweight metal pieces having a U-shaped section are attached so as to extend from inside the grip at the connecting portion with the shaft to both outer side portions of the bifurcated shaft.

The lightweight metal pieces can, for example, increase the rigidity of the shaft while greatly damping the shock transmitted to the grip since the metal piece has a U-shaped section and the opened side will flexibly expand to allow deflection of the shaft. Further, since the lightweight metal pieces with a U-shaped section are attached to the shaft which corresponds to the antinode of the second mode of vibration that occurs on the racket after stroking, and since the ends of the metal pieces are connected to the grip inside the grip, rigidity may be increased and residual vibration may be forcedly restrained. Therefore, it is possible to, for example, greatly damp the vibration transmitted to the grip.

As explained above, the lightweight metal pieces may extend from the connecting portion of the grip and the shaft to a point beyond a middle of the shaft, and perhaps, the lightweight metal pieces may extend across almost a whole length of the shaft.

Through such a structure, for example, the toughness of the shaft is be increased, the shock transmissibility is greatly decreased, and the vibration-damping ratio is significantly enhanced.

Further, as explained above, the lightweight metal pieces may be formed from a metal selected from pure metal or an alloy having a specific gravity of 7.6 g/cm$^3$ or less, for example, from aluminum, titanium or magnesium. By using such a metal, for example, the above-mentioned reduction in shock transmissibility can be achieved while keeping increase in racket weight as small as possible. In view of cost efficiency and practicality, use of aluminum may be preferred.

Further, as explained above, in a case where the lightweight metal pieces are attached to the shaft through an elastic adhesive, the vibration transmitted to the shaft may be absorbed by the elastic material, similar to a case in which an elastic member is placed between the lightweight metal pieces and the shaft, and thus, the vibration-damping effect may be further enhanced. The flexibility of the shaft may also be enhanced.

Although the preferred embodiment of the present invention has been described in detail, it should be understood that various changes, substitutions and alterations can be made without departing from spirit and scope of the inventions as defined by the appended claims.

What is claimed is:

1. A tennis racket comprising:
   a frame;
   a shaft connected to said frame at one end thereof;
   a grip into which said shaft is inserted at the other end thereof; and a pair of lightweight metal pieces attached to said shaft, said frame and said shaft being formed from fiber-reinforced synthetic resin, said pair of lightweight metal pieces having a U-shaped section and extending from inside said grip at a connecting portion with said shaft and along both sides of said shaft.

2. A tennis racket according to claim 1, wherein said shaft is bifurcated from said grip towards said frame, and said pair of lightweight metal pieces having a U-shaped section are attached so as to extend from inside said grip at the connecting portion with said shaft to both outer side portions of said bifurcated shaft.

3. A tennis racket according to claim 1, wherein said lightweight metal pieces extend from said connecting portion of said grip and said shaft to a point beyond a middle of said shaft.

4. A tennis racket according to claim 1, wherein said lightweight metal pieces extend across almost a whole length of said shaft.

5. A tennis racket according to claim 1, wherein said lightweight metal piece is formed from a metal selected from pure metal or an alloy having a specific gravity of 7.6 g/cm$^3$ or less.

6. A tennis racket according to claim 1, wherein said lightweight metal piece is formed from a metal selected from the group consisting of aluminum, titanium, and magnesium.

7. A tennis racket according to claim 1, wherein said lightweight metal pieces are attached to said shaft through an elastic adhesive.

8. A tennis racket comprising:

a frame;

a shaft connected to said frame at one end thereof;

a grip into which said shaft is inserted at the other end thereof; and a pair of lightweight metal pieces attached to said shaft, said frame and said shaft being formed from fiber-reinforced synthetic resin, said pair of lightweight metal pieces having a U-shaped section and either extending from said connecting portion of said grip and said shaft to a point beyond a middle of said shaft, or extending across almost a whole length of said shaft, said lightweight metal piece being formed from a metal selected from pure metal or an alloy having a specific gravity of 7.6 g/cm$^3$ or less.

9. A tennis racket according to claim 8, wherein said lightweight metal piece is formed from a metal selected from the group consisting of aluminum, titanium, and magnesium.

10. A tennis racket according to claim 8, wherein said lightweight metal pieces are attached to said shaft through an elastic adhesive.

11. A tennis racket comprising:

a frame;

a shaft connected to said frame at one end thereof;

a grip into which said shaft is inserted at the other end thereof; and a pair of lightweight metal pieces attached to said shaft, said frame and said shaft being formed from fiber-reinforced synthetic resin, said shaft being bifurcated from said grip towards said frame, said pair of lightweight metal pieces having a U-shaped section and extending from inside said grip at a connecting portion with said shaft to both outer side portions of said bifurcated shaft, said pair of lightweight metal pieces either extending from said connecting portion of said grip and said shaft to a point beyond a middle of said shaft, or extending across almost a whole length of said shaft, said lightweight metal piece being formed from a metal selected from pure metal or an alloy having a specific gravity of 7.6 g/cm$^3$ or less.

12. A tennis racket according to claim 11, wherein said lightweight metal piece is formed from a metal selected from the group consisting of aluminum, titanium, and magnesium.

13. A tennis racket according to claim 11, wherein said lightweight metal pieces are attached to said shaft through an elastic adhesive.

* * * * *